United States Patent [19]

Barker et al.

[11] Patent Number: 4,893,472
[45] Date of Patent: Jan. 16, 1990

[54] COLLAPSIBLE TUBULAR DIAPHRAGM FOR MASTER CYLINDER RESERVOIR

[75] Inventors: David C. Barker, Utica; Keith V. Leigh-Monstevens, Troy, both of Mich.

[73] Assignee: Automotive Products plc, Warwickshire, England

[21] Appl. No.: 161,010

[22] Filed: Feb. 26, 1988

[51] Int. Cl.⁴ ............................................. B60T 11/26
[52] U.S. Cl. ...................................... 60/562; 60/585; 60/588; 92/142
[58] Field of Search ................. 60/562, 583, 585, 588, 60/589; 141/23–26; 138/30; 92/142

[56] References Cited

U.S. PATENT DOCUMENTS

| | | | |
|---|---|---|---|
| 2,485,752 | 10/1949 | Laspe et al. | 138/30 X |
| 2,677,393 | 5/1954 | Cornelius | 138/30 X |
| 3,143,144 | 8/1964 | Peet | 138/30 |
| 3,277,925 | 10/1966 | Sugimura | 138/30 |
| 3,357,181 | 12/1967 | Thirion | 60/588 |
| 3,473,565 | 10/1969 | Blendermann | 138/30 X |
| 3,756,367 | 9/1973 | Mitchell et al. | 188/352 |
| 3,886,747 | 6/1975 | Harwick et al. | 60/585 |
| 3,913,327 | 10/1975 | Shellhause | 60/585 |
| 4,307,815 | 12/1981 | Sakazume | 60/585 X |
| 4,407,125 | 10/1983 | Parsons | 60/585 X |
| 4,590,765 | 5/1986 | Leigh-Monstevens | 60/585 |

FOREIGN PATENT DOCUMENTS 1525550 2/1970 Fed. Rep. of Germany ........ 138/30
1229064 4/1971 United Kingdom .

Primary Examiner—Robert E. Garrett
Assistant Examiner—George Kapsalas
Attorney, Agent, or Firm—Krass and Young

[57] ABSTRACT

A hydraulic master cylinder assembly of the type including a reservoir in which a diaphragm is disposed to divide the reservoir chamber into a hydraulic fluid chamber outside of the diaphragm and in communication with the pressure chamber of the master cylinder and a gas chamber within the diaphragm. The diaphragm is generally tubular with an open end and a closed end, and in a cross section transverse to the central axis of the diaphragm, includes a plurality of radially extending arms arranged about the central axis of the diaphragm and each including a pair of side walls defining therebetween a portion of the volume of the gas chamber. The diaphragm is movable between an expanded condition in which it assumes a substantially circular configuration in cross section and a collapsed condition in which each of the pairs of side walls of the arms are collapsed with respect to each other to reduce the volume of the chamber. In the disclosed embodiment, the arms are arrayed about the central axis of the diaphragm in symmetrical fashion and four arms are provided to define a cross or crucifix configuration.

12 Claims, 2 Drawing Sheets

COLLAPSIBLE TUBULAR DIAPHRAGM FOR MASTER CYLINDER RESERVOIR

BACKGROUND OF THE INVENTION

This invention relates to hydraulic apparatus and more particularly to a diaphragm especially suited for use in the reservoir of the hydraulic apparatus.

More specifically, the present invention is concerned with a diaphragm for use in a master cylinder assembly of the type including a cylinder defining a pressure chamber and a reservoir port in communication with the pressure chamber, a piston mounted for reciprocal movement in the pressure chamber, and a reservoir in fluid communication with the pressure chamber of the cylinder and arranged to supply hydraulic fluid selectively to the pressure chamber of the cylinder. A diaphragm is typically employed in the reservoir to separate the reservoir into a liquid chamber in communication with the pressure chamber of the master cylinder and a gas chamber normally in communication with the atmosphere. The diaphragm forms an impervious barrier within the reservoir to keep liquid in the system and air out of the system; prevents moisture from entering the liquid; allows for expansion and contraction of the liquid under temperature variations; allows for variations in atmospheric conditions; and acts as a flexible medium to compensate for liquid flow into and out of the reservoir during actuation of the associated master cylinder and to compensate for changes in the volume of the liquid in the system due to wear in the system or system leakage.

Several forms of diaphragms have been used in the prior art. One form of diaphragm in common usage has a generally top hat cross-sectional configuration. Whereas this diaphragm is satisfactory in some applications, it is capable of only a minor expansion relative to its total volume so that it is limited in its ability to compensate for under filling of the system, wear in the system, or leakage in the system. Another form of diaphragm in common usage employs a pleated or bellows configuration. Whereas this type of diaphragm has a larger expansion capacity, it has a tendency to trap air between the pleats of the diaphragm as the diaphragm moves to a collapsed or contracted condition. This air can ultimately find its way into the master cylinder system. The pleated diaphragms are also subject to fatigue cracking at the crease points of the pleats. Another form of diaphragm in popular usage includes a generally top hat cross-sectional configuration with a rolled portion adjacent the upper end of the top hat. Whereas the rolled portion increases the capacity of the diaphragm as compared to the simple, top hat type diaphragm, the rolls tend to eventually fatigue at the crease points with consequent failure of the diaphragm.

SUMMARY OF THE INVENTION

The present invention is directed to the provision of a master cylinder assembly having a diaphragm of improved performance characteristics.

More specifically, the present invention is directed to the provision of a master cylinder assembly having a diaphragm which is inexpensive and readily moldable, is extremely durable, and provides a large coefficient of expansion so as to provide excellent compensating capacity with respect to changes in the volume of the liquid in the system.

The diaphragm of the invention is intended for use with hydraulic apparatus of the type including a hydraulic displacement mechanism including a housing having a pressure chamber and a discharge port for discharge of hydraulic fluid from the pressure chamber in response to actuation of the hydraulic displacement mechanism, a reservoir having a housing defining a reservoir chamber including a discharge port communicating the reservoir chamber with the pressure chamber of the hydraulic displacement mechanism, and a flexible diaphragm positioned in the reservoir chamber and dividing the reservoir chamber into a liquid chamber portion on one side of the diaphragm in communication with the reservoir discharge port and a gas chamber portion on the other side of the diaphragm in communication with the atmosphere. The invention diaphragm has a tubular configuration with an open end and a closed end and, in a cross section transverse to the central axis of the diaphragm, includes a plurality of radially extending arms arranged about the central axis and each including a pair of side walls defining therebetween a portion of the volume of the gas chamber. The diaphragm is movable between an expanded condition in which it assumes a substantially circular configuration in cross section and a collapsed condition in which each of the pairs of side walls of the arms are collapsed with respect to each other to reduce the volume of the gas chamber. This construction is readily and inexpensively manufacturable, is extremely durable, and provides a large variation in capacity as between the fully expanded and fully collapsed conditions of the diaphragm.

According to a further feature of the invention, the diaphragm includes an annular mounting portion at its open end and a tubular main body portion extending from the mounting portion to its closed end, and the arms are formed by a series of axially extending circumferentially spaced flutes along the main body portion and a series of axially extending circumferentially spaced rounded ridges interconnecting the flutes. This arrangement provides a readily manufacturable product and provides large capacity variation as between the collapsed and expanded states.

In the disclosed embodiment of the invention, four arms are provided arranged symmetrically about the central axis of the diaphragm and each of the arms has a generally pear-shaped, reentrant configuration in cross section with the larger, bulbous portion of the arm remote from the central axis of the diaphragm.

DETAILED DESCRIPTION OF THE PREFERRED EMBODIMENTS

Figure 1:
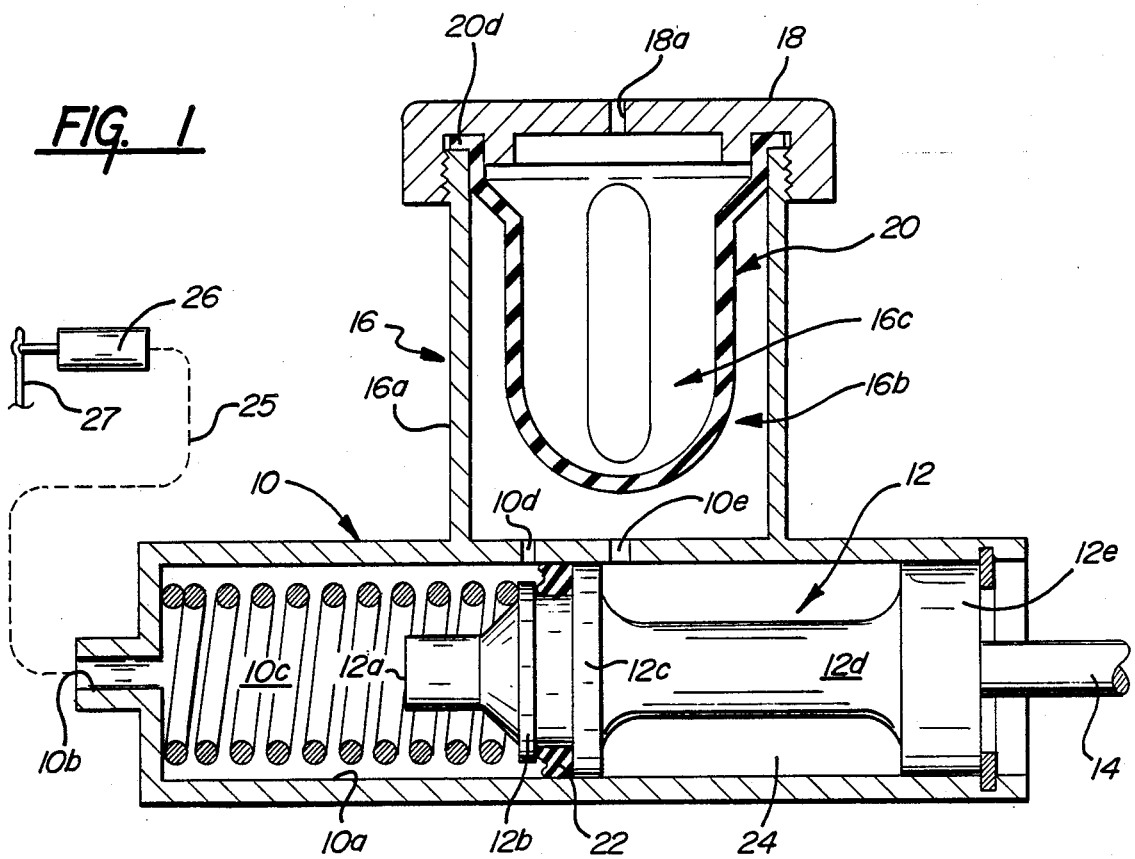
FIG. 1 is a cross-sectional view of a master cylinder assembly according to the invention employing a diaphragm according to the invention.
Figure 2:
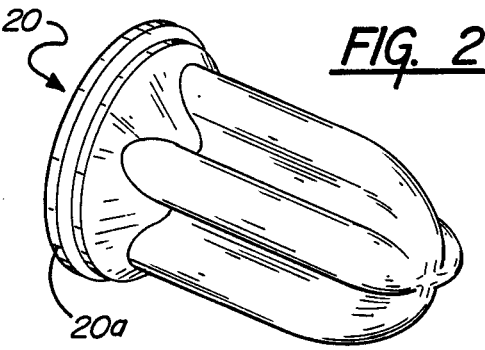
FIG. 2 is a perspective view of the diaphragm employed in the master cylinder assembly of FIG. 1.
Figure 3:
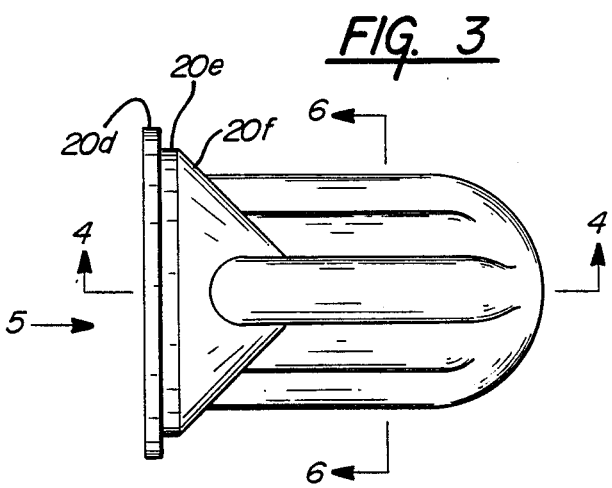
FIG. 3 is a side view of the invention diaphragm.
Figure 4:
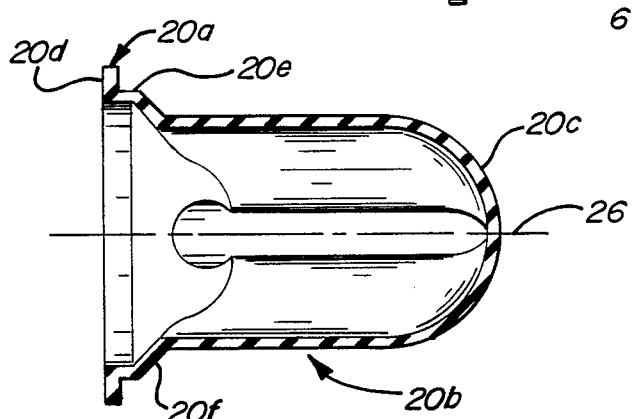
FIG. 4 is a cross-sectional view taken on line 4—4 of FIG. 3.
Figure 5:
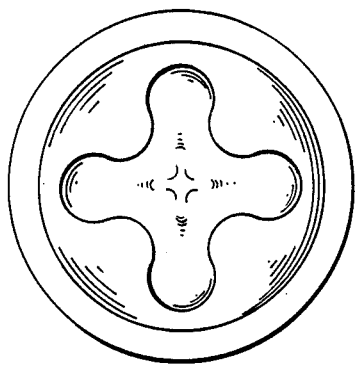
FIG. 5 is an interior view of the invention diaphragm looking in the direction of the arrow 5 in FIG. 3.

The master cylinder assembly seen in FIG. 1 includes a cylinder 10 defining an internal bore 10a and a discharge port 10b at the forward end of the cylinder; a piston 12 mounted for reciprocal movement within the bore 10a and including a nose 12a, a flange 12b, a forward land 12c, a central reduced diameter spool portion 12d, a rearward land 12e; a piston rod 14; and a reservoir 16 formed integrally with cylinder 10. Reservoir 16 includes a reservoir body 16a closed at its lower end by cylinder 10 and open at its upper end, a screw-on cap 18 threadably engageable with the upper end of body 16a and including a central bleed port 18a, and a diaphragm 20.

Diaphragm 20 is positioned within reservoir body 16a and divides the chamber of the reservoir body 16a into a lower liquid chamber portion 16b, defined outside of the diaphragm, and an upper gas chamber portion 16c, defined within the diaphragm.

Upper gas chamber portion 16a is in communication with atmosphere through bleed port 18a and lower liquid chamber portion 16b is in communication with the pressure chamber 10c defined forwardly of piston 12 through an orifice or port 10d and through a second orifice or port 10e. Orifice 10d is disposed immediately forwardly of an annular seal 22 disposed in the seal groove defined between piston flange 12b and piston land portion 12c so that the pressure chamber 10c is in fluid communication with liquid chamber 16b of the reservoir with the piston in the extreme retracted position as seen in FIG. 1 and so that the port 10d is immediately closed upon forward movement of the piston in response to actuation of the master cylinder to block communication between the pressure chamber and the reservoir as the piston moves through its forward working stroke. As the piston is thereafter retracted to its position of FIG. 1, port 10d is again opened to provide communication between fluid chamber 16b and pressure chamber 10c so as to allow compensating flow, if necessary, into the chamber 10c. Port 10e maintains constant communication between liquid chamber 16b and the area behind piston land portion 12c such that the annular chamber 24 defined around the piston spool portion 12d is always filled with hydraulic fluid, as is well-known in the art.

Diaphragm 20 is generally tubular and includes an open upper end and a blind or closed lower end. The diaphragm includes an annular mounting or collar portion 20a defining the open upper end of the diaphragm and a main body portion 20b extending downwardly from collar portion 20a to define the closed lower end 20c of the diaphragm. Collar portion 20a includes a lip 20d, an annular shoulder portion 20e, and a conical portion 20f. The diaphragm is mounted within reservoir 16 by clamping lip 20d between the upper annular edge of reservoir body 16a and reservoir cap 18 with the main body of the diaphragm extending downwardly into the reservoir.

Figure 6:
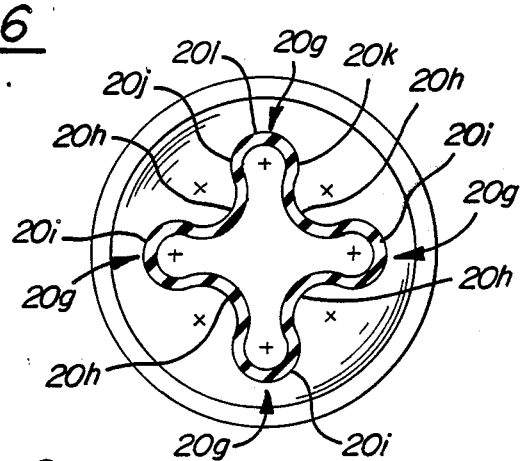
FIG. 6 is a cross-sectional view taken on line 6—6 of FIG. 3.

Main body portion 20b, in transverse cross section as seen in FIG. 6, includes a plurality of radially extending arms 20g arrayed symmetrically about the central axis 26 of the diaphragm. As disclosed, there are four arms 20g arranged symmetrically about the central axis of the diaphragm so as to define a cross or crucifix configuration. The arms are defined by a flutes 20h extending along the main body portion from conical portion 20f of the collar portion to the closed end 20c of the diaphragm and a series of rounded ridges 20i generally coextensive with the flutes and interconnecting the flutes to form the final crucifix configuration. Ridges 20i and flutes 20h each have an arcuate configuration and the centers and radii of the arcs are chosen such that the resulting arm has a generally pear-shaped, reentrant configuration with the larger, bulbous portion of the arm remote from the central diaphragm axis. The adjacent flutes and ridges will also be seen to coact to define pairs of side walls 20j and 20k, each defining an arm 20g with each side wall defined in part by a portion of a rounded ridge 20i and in part by a portion of an adjacent flute 20h.

Figure 7:
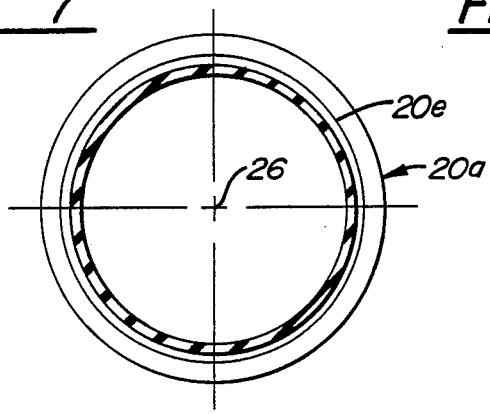
FIG. 7 is a cross-sectional view of the invention diaphragm showing the diaphragm in its extreme expanded condition.
Figure 8:
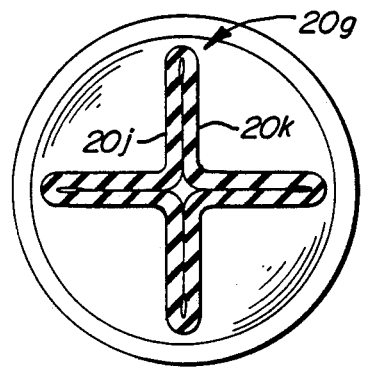
FIG. 8 is a cross-sectional view of the invention diaphragm showing the diaphragm in its extreme collapsed condition.

As best seen in FIGS. 7 and 8, the invention diaphragm may expand substantially from its relaxed or normal position of FIG. 6 and may contract substantially from its relaxed or normal configuration of FIG. 6.

Specifically, as seen in FIG. 7, the main body portion of the diaphragm, in its extreme expanded condition, may assume a circular configuration with the radius of the circle significantly exceeding the radius of the arms 20g with the diaphragm in its relaxed condition. In its extreme expanded condition, the diaphragm assumes a circular configuration at Section 6—6 having a diameter substantially approximating the diameter of shoulder portion 20e of collar portion 20a.

Conversely, in its extreme collapsed condition as seen in FIG. 8, the side walls 20j and 20k, defining each arm, collapse totally upon each other to substantially eliminate the gas chamber defined within the diaphragm. Whereas neither of these extreme conditions are typically ever achieved or utilized in the normal operation of the associated master cylinder assembly, the expanded and collapsed configurations as seen in FIGS. 7 and 8 illustrate the extreme variation in capacity provided by the invention diaphragm.

The invention diaphragm may be formed of any suitable impervious elastomeric material. An ethylene propylene rubber material has been found to be particularly suitable for use in forming the invention diaphragm.

It will be understood that, in use, the invention diaphragm expands and contracts to selectively maintain a totally filled condition on the liquid side of the diaphragm. For example, the diaphragm is ordinarily utilized in a master and slave cylinder assembly in which the pressure fluid discharged from discharge port 10b is delivered by a conduit 25 to a slave cylinder 26 for use, for example, in actuating a clutch release member 27 of a motor vehicle. The master cylinder, conduit, slave cylinder, and reservoir are prefilled with hydraulic fluid prior to delivery to the motor vehicle manufacturer. If the prefill is somewhat less than the specified prefill amount, the diaphragm automatically expands to provide a totally filled configuration on the liquid side of the diaphragm and, conversely, if the prefill amount is in excess of the specified amount, the diaphragm automatically contracts to allow the overfill while maintaining a totally filled condition on the liquid side of the diaphragm. Similarly, as wear occurs in the system over extended period of usage, the diaphragm selectively contracts to maintain the totally filled condition of the liquid system and as leakage occurs in the system, the diaphragm similarly expands to maintain a totally filled liquid condition in the system. Further, as liquid flows into and out of the reservoir during the actuation of the associated master cylinder, the diaphragm selectively expands and contracts to maintain a completely liquid-filled condition on the liquid side of the diaphragm.

The invention diaphragm will be seen to provide many important advantages as compared to prior art diaphragms. Specifically, the invention diaphragm provides a high ratio as between the fully expanded and fully contracted volumes of the diaphragm so as to easily maintain a totally liquid-filled condition on the liquid side of the diaphragm in any operating condition encountered in the associated master cylinder assembly. Further, the invention diaphragm is of simple construction and can therefore be readily and inexpensively manufactured. Further, the invention diaphragm has a totally rounded configuration so as to avoid creasing and ultimate fatigue cracking at the crease points. Further, the invention diaphragm, by virtue of the manner in which it moves between its fully collapsed and fully expanded conditions, totally avoids the problem of certain prior art diaphragms with respect to trapping air between portions of the diaphragm as the diaphragm moves to its collapsed condition.

Figure 9:
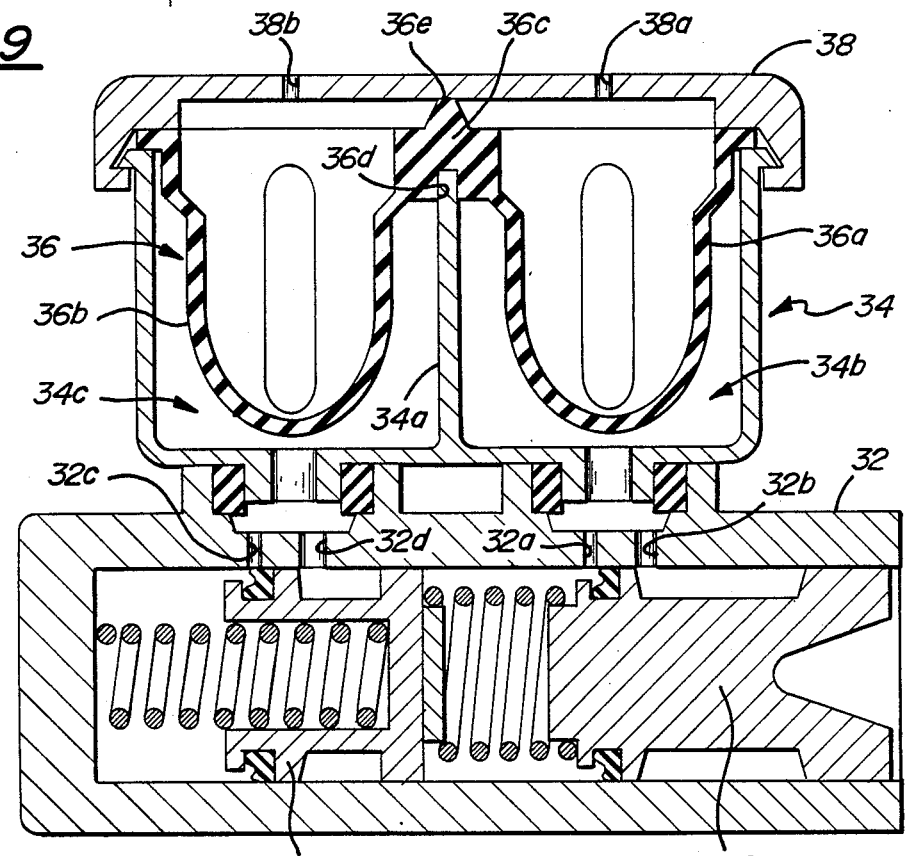
FIG. 9 is a cross-sectional view of a diaphragm according to the invention employed in a dual master cylinder assembly.

Another embodiment of the invention hydraulic apparatus is seen in FIG. 9 wherein the invention diaphragm is applied to a dual master cylinder assembly.

Specifically, the dual master cylinder assembly of FIG. 9 includes a pair of pistons 28 and 30 positioned in tandem fashion and in known manner within the dual cylinder 32; a reservoir 34 mounted on cylinder 32 and including a central partition 34a dividing the reservoir chamber into a first chamber 34b for coaction with piston 30 through ports 32a and 32b and a second chamber 34c for coaction with piston 28 through ports 32c and 32d; and a diaphragm 36 according to the invention adapted for coaction with reservoir chambers 34b and 34c.

Specifically, diaphragm 36 has a construction generally conforming to the construction described with reference to FIGS. 1–8 but replicated so that a first main body portion 36a is positioned within chamber 34b and a second main body portion 36b is positioned within chamber 34c to, in each case, divide the reservoir chamber into a liquid chamber portion and a gas chamber portion. The diaphragm 36 includes a lip portion 36c clamped to the upper peripheral edge of the reservoir body by a reservoir cap 38, including bleed holes 38a and 38b for respective communication with the interiors of main body portions 36a and 36b. Diaphragm 36 further includes a central portion 36c interconnecting the two main body portions 36a and 36b and including a groove 36d for frictional receipt of the upper edge of partition 34a and a ridge 36e for sealing coaction with the adjacent underface of reservoir cap 38.

The compound diaphragm of FIG. 9 acts in conjunction with the illustrated dual master cylinder assembly to provide a large expansion and contraction capacity with respect to each of the reservoir chambers 34b and 34c in the manner previously described with respect to the diaphragm illustrated in FIGS. 1–8. Specifically, the compound diaphragm seen in FIG. 9 acts to maintain a totally liquid-filled condition in each of the dual systems of the dual master cylinder assembly irrespective of wear in the system, leakage in the system, temperature variations, pressure variations, or overfill or underfill conditions.

Whereas preferred embodiments of the invention have been illustrated and described in detail, it will be apparent that various changes may be made in the disclosed embodiments without departing from the scope or spirit of the invention.

We claim:

1. A hydraulic apparatus of the type including a hydraulic displacement mechanism including a housing having a pressure chamber and a discharge port for discharge of hydraulic fluid from said pressure chamber in response to actuation of said hydraulic displacement mechanism; a reservoir having a housing sidewall defining a cylindrical reservoir chamber including a discharge port communicating said reservoir chamber with said pressure chamber; and a flexible diaphragm positioned in said reservoir chamber and dividing said reservoir chamber into a liquid chamber portion on one side of said diaphragm and in communication with said reservoir discharge port and a gas chamber portion on the other side of said diaphragm and blocked from said reservoir discharge port by said diaphragm; the improvement wherein:

(A) said diaphragm has a tubular configuration with an open end and a closed end;

(B) said open end of said diaphragm is vented to atmosphere so that said gas chamber is at atmospheric pressure;

(C) said diaphragm includes an annular mounting portion at its open end and a tubular main body portion extending from said mounting portion to its closed end;

(D) said main body portion, in a cross section transverse to the central axis extending between the ends of the diaphragm, includes a plurality of radially extending arms arranged about said central axis and each, in the relaxed configuration of said diaphragm, including a pair of side walls forming a rounded ridge at their radially outer ends centered on a point between the radially outer end of the arm and the central axis of said diaphragm and defined therebetween a portion of the volume of said gas chamber, the radially outer ends of said ridges, in the relaxed configuration of said diaphragm, being positioned substantially radially inwardly from the inner, chamber surface of said reservoir housing sidewall; and (E) said main body portion maintains a static system of balance as between said liquid chamber and said ambient gas chamber but is movable in response to wear or liquid leakage in the apparatus between an expanded condition in which it assumes a substantially circular configuration in cross section having a diameter substantially corresponding to the inner diameter of said reservoir sidewall and a collapsed condition in which each of said pairs of side walls of said arms are collapsed with respect to each other to reduce the volume of said gas chamber.

2. A hydraulic apparatus according to claim 1 wherein said hydraulic displacement mechanism comprises a master cylinder, said apparatus further includes a slave cylinder, said apparatus is intended for use by a motor vehicle manufacturer to actuate a motor vehicle control system, and said reservoir master cylinder, and slave cylinder are prefilled with hydraulic fluid prior to delivery to the motor vehicle manufacturer.

3. A hydraulic apparatus according to claim 1 wherein:

(F) said arms are formed by a series of axially extending circumferentially spaced flutes along said main body portion with a series of said rounded ridges interconnecting said flutes.

4. A hydraulic apparatus according to claim 3 wherein:

(G) said arms are arrayed symmetrically about said axis.

5. A hydraulic apparatus according to claim 4 wherein:

(H) at least three arms are provided.

6. A hydraulic apparatus according to claim 5 wherein:

(I) four arms are provided to define a cross configuration.

7. A hydraulic apparatus according to claim 5 wherein:

(I) said hydraulic displacement mechanism comprises a master cylinder assembly having a cylinder defining said pressure chamber and said discharge port and a piston mounted for reciprocation in said cylinder.

8. A hydraulic apparatus according to claim 7 wherein:

(J) said reservoir is mounted directly to said cylinder and said discharge port opens directly in said pressure chamber.

9. A hydraulic apparatus according to claim 8 wherein:

(K) said master cylinder assembly is a dual master cylinder assembly with separate pistons mounted for reciprocal movement in the cylinder;

(L) said reservoir defines first and second reservoir chambers for coaction with the first and second pistons in the cylinder;

(M) said diaphragm includes a pair of tubular main body portions extending from said mounting portion and disposed respectively in said first and second reservoir chambers to divide the respective reservoir chambers into a liquid chamber portion and a gas chamber portion.

10. A hydraulic apparatus comprising:

(A) a cylinder defining a pressure chamber and a reservoir port in communication with said pressure chamber;

(B) a piston mounted for reciprocal movement in said pressure chamber;

(C) a reservoir mounted on said cylinder and including a closed end adjacent said reservoir port and an open end remote from said reservoir port; and (D) a diaphragm of tubular configuration having an open end and a closed end;

(E) said diaphragm including an annular mounting portion adjacent its open end for mounting on the open end of said reservoir and a main body portion positioned within said reservoir and extending from said mounting portion to said closed end thereof so as to divide said reservoir into a liquid chamber outside of said diaphragm and in communication with said reservoir port and a gas chamber within said diaphragm;

(F) said reservoir including means venting the open end of said diaphragm to atmosphere so that said gas chamber is at atmospheric pressure;

(G) said main body portion including an annular lip portion for seating on the open end of said reservoir and a conical portion interposed between said lip portion and said main body portion and converging toward said closed end of said diaphragm;

(H) said main body portion maintaining a static system of balance between said liquid chamber and said gas chamber but including a series of axially extending circumferentially spaced flutes extending along said main body portion and a series of axially extending circumferentially spaced rounded ridges extending along said main body portion between said flutes and coacting with said flutes to form a series of radially extending arms arranged about the central axis of the diaphragm, said arms opening in said conical portion proximate the open end of said diaphragm and allowing said main body portion to move in response to wear and liquid leakage in the apparatus between expanded and collapsed conditions.

11. A hydraulic apparatus according to claim 10 wherein:

(I) each arm comprises a pair of side walls with each side wall comprising a portion of a flute and a portion of an adjoining ridge.

12. A hydraulic apparatus according to claim 11 wherein:

(J) each of said arms is generally pear-shaped in cross section with the larger, bulbous portion of the arm remote from the diaphragm axis.

* * * * *